Oct. 4, 1932.  F. W. SEYBOLD  1,880,332
PAPER CUTTING MACHINE
Filed May 20, 1929   9 Sheets-Sheet 1
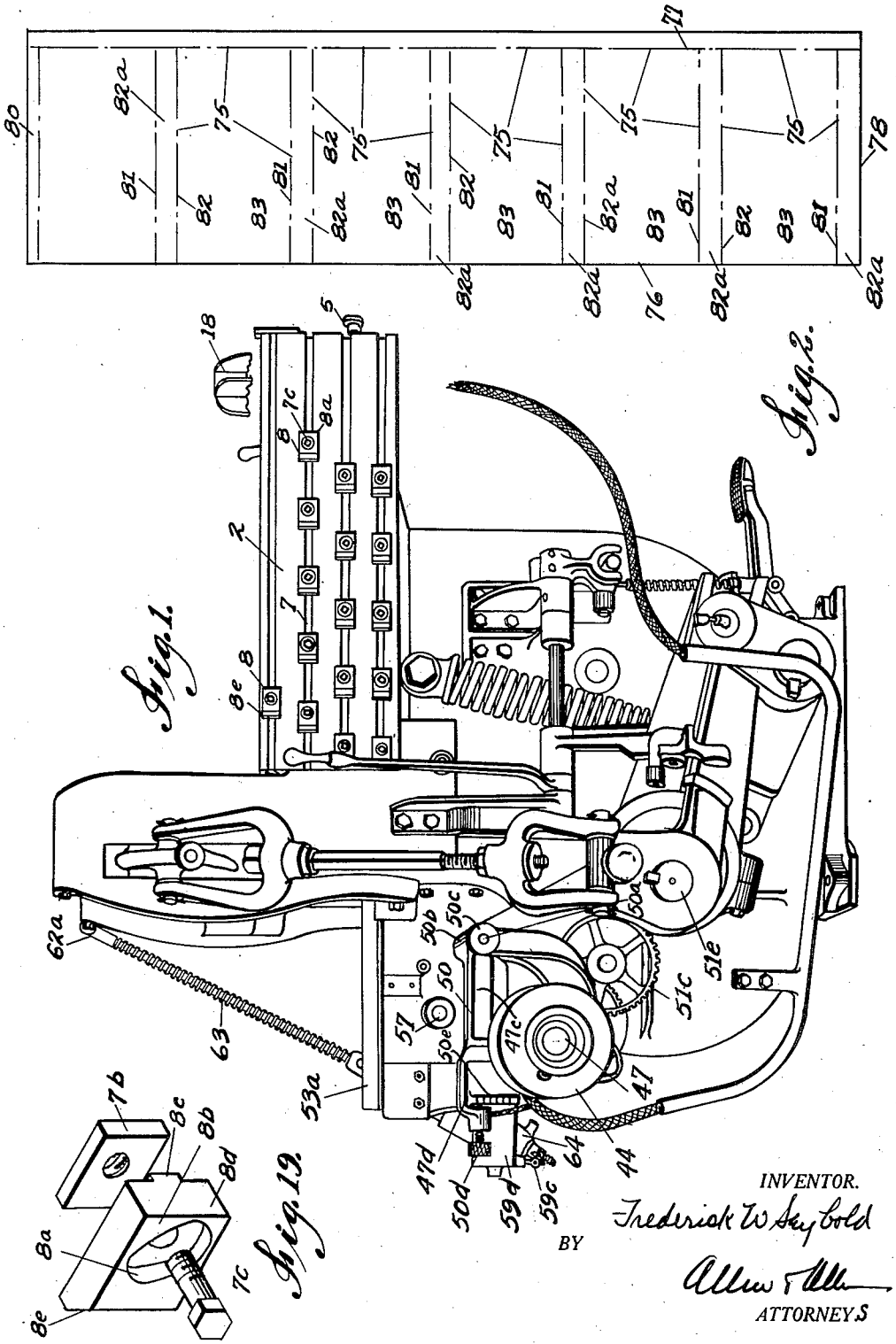
INVENTOR.
Frederick W Seybold
BY
ATTORNEYS

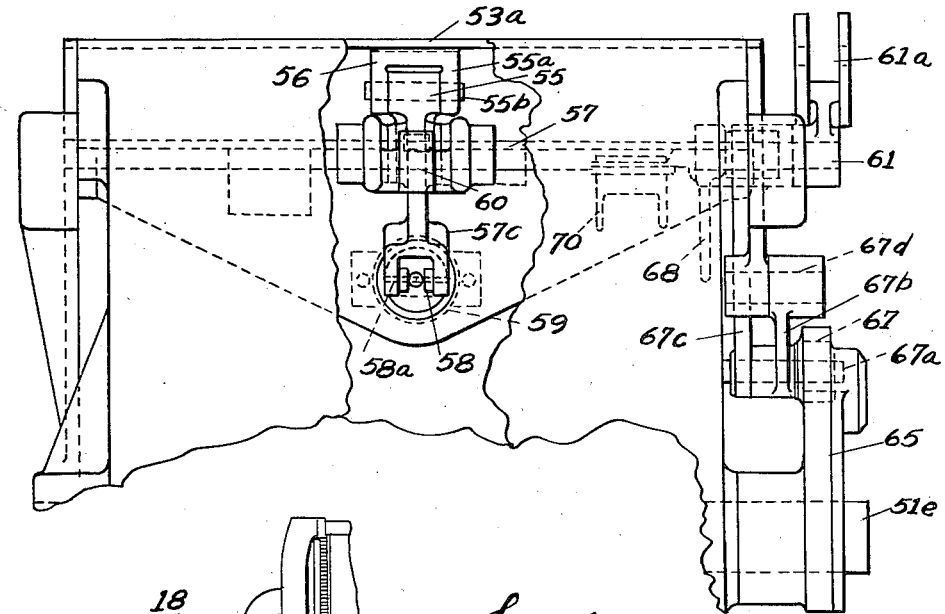
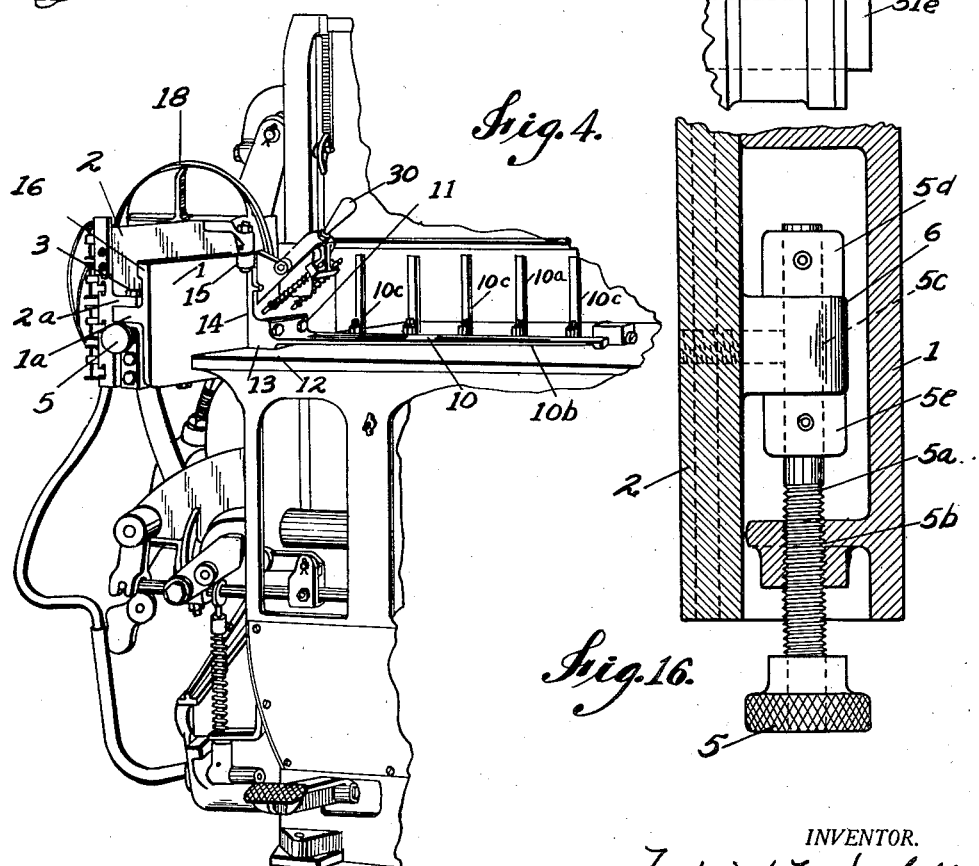

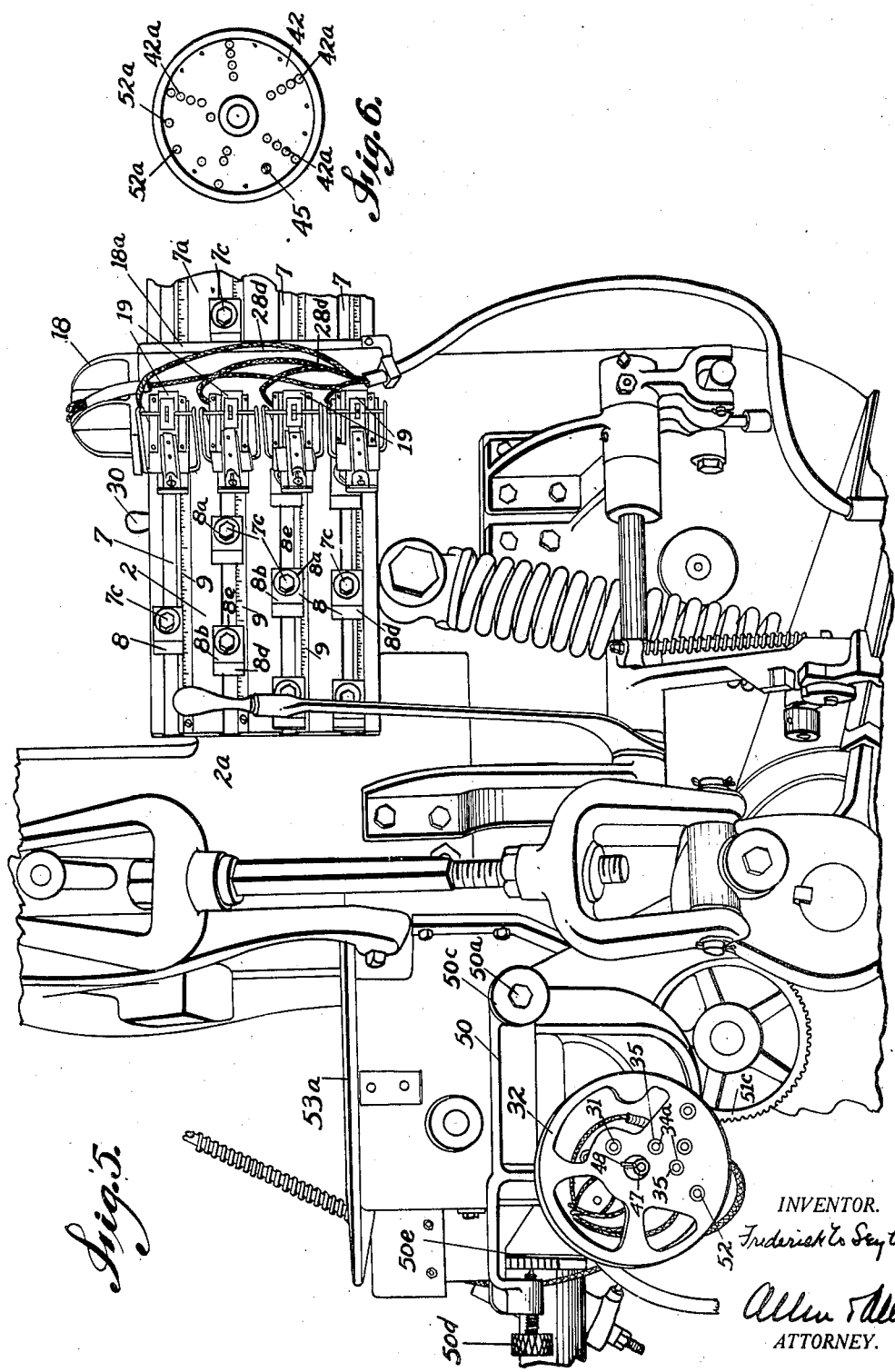

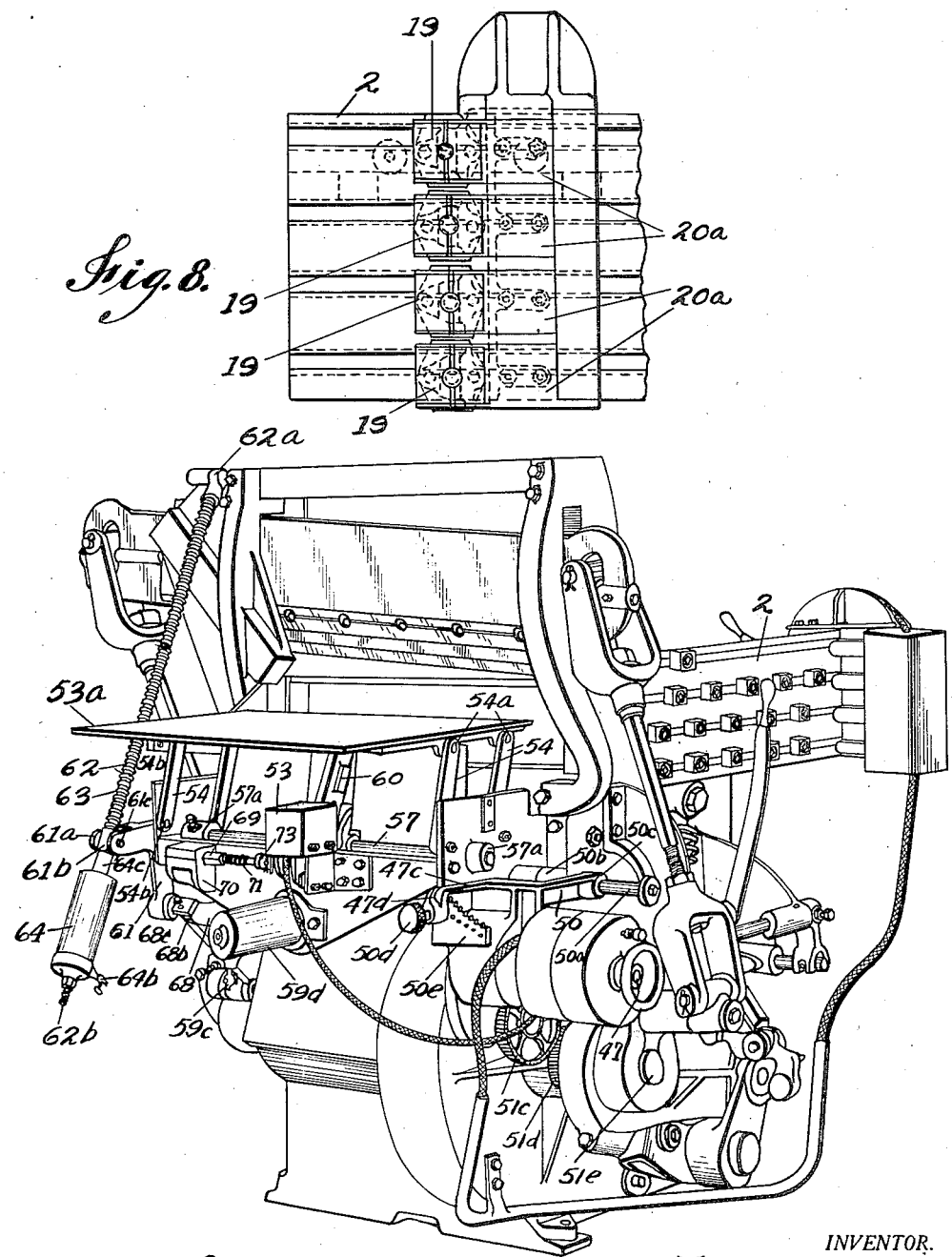

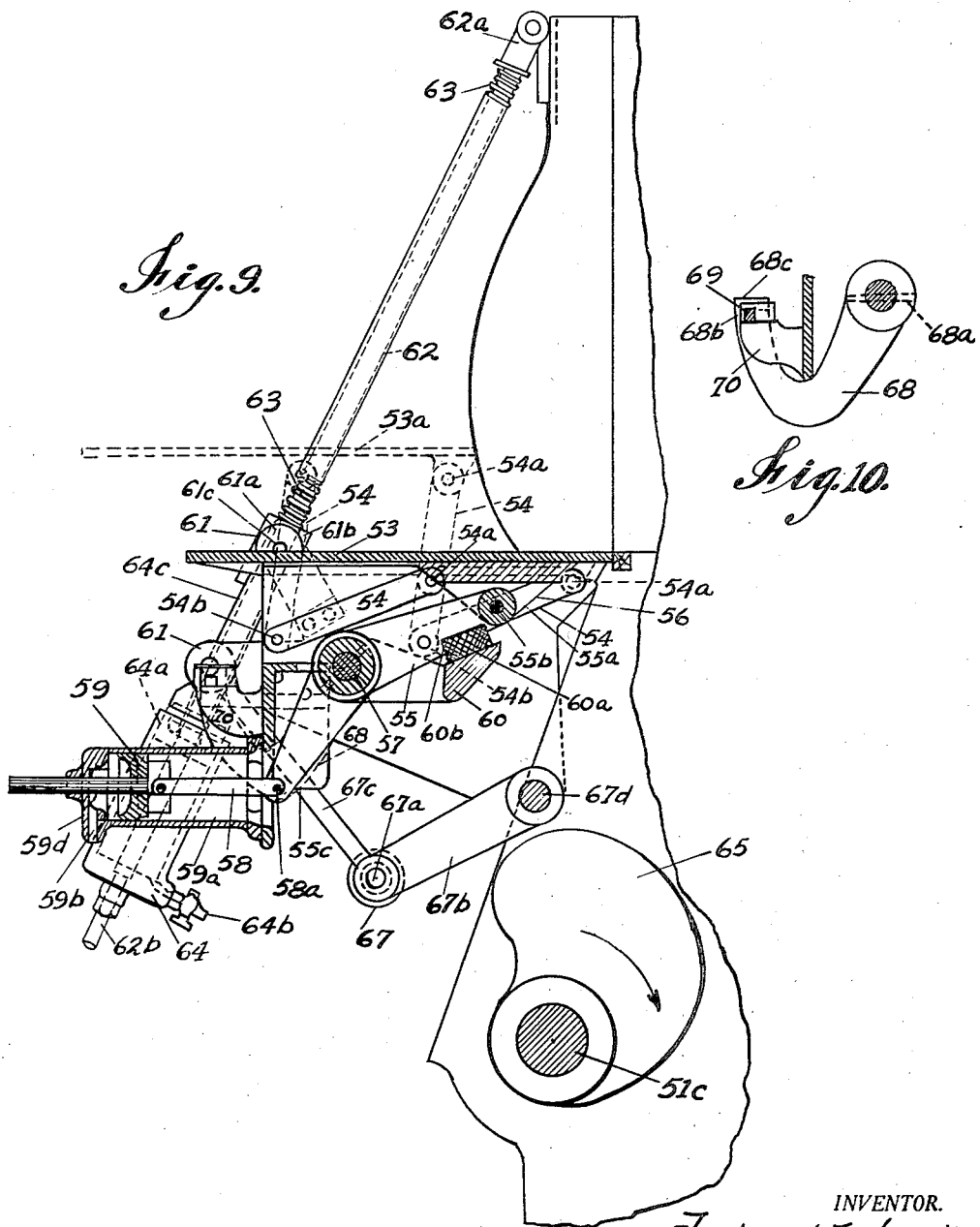

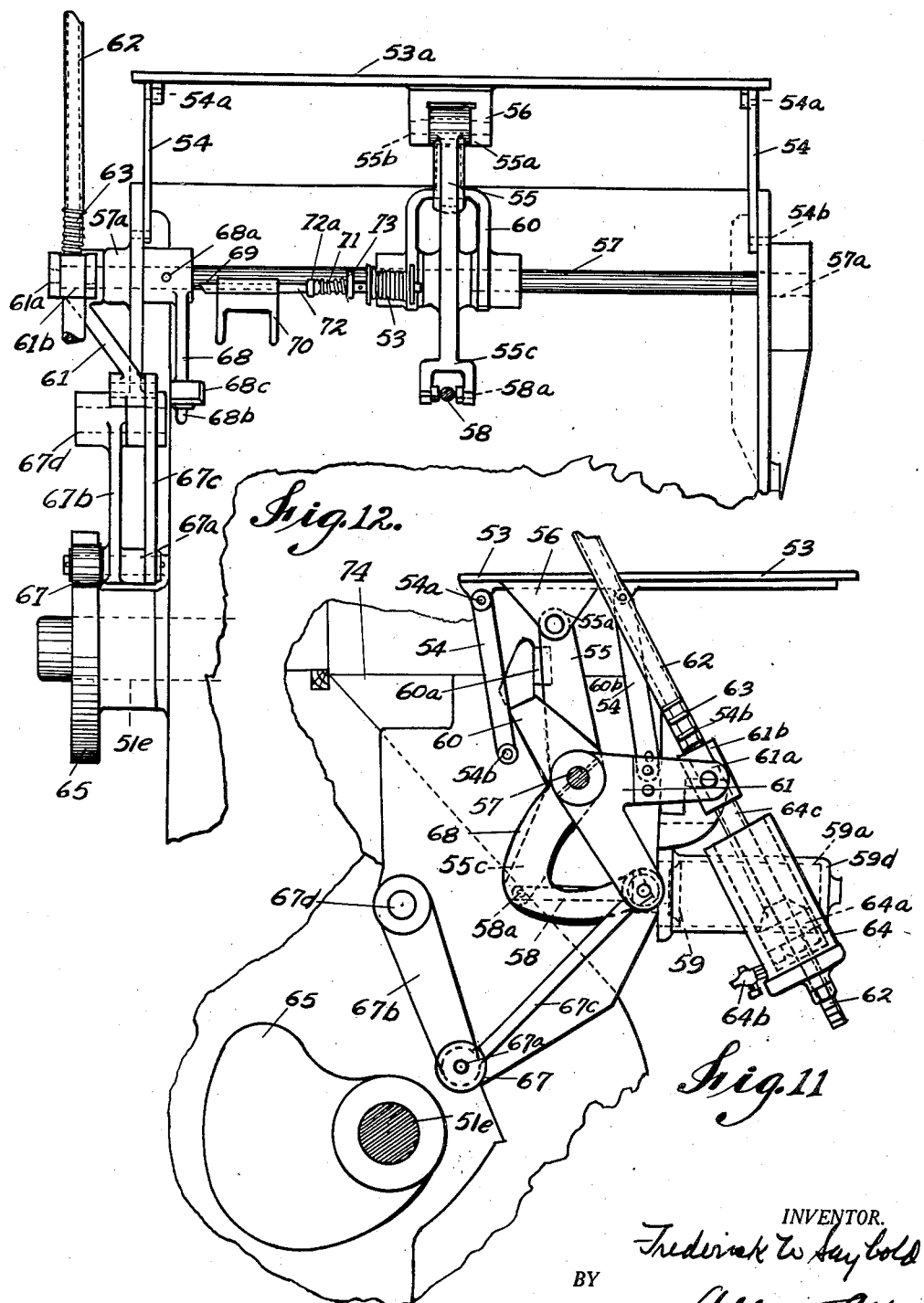

Oct. 4, 1932.   F. W. SEYBOLD   1,880,332
PAPER CUTTING MACHINE
Filed May 20, 1929   9 Sheets-Sheet 7

INVENTOR.
Frederick W. Seybold
BY
ATTORNEY.

Oct. 4, 1932.   F. W. SEYBOLD   1,880,332
PAPER CUTTING MACHINE
Filed May 20, 1929   9 Sheets-Sheet 8
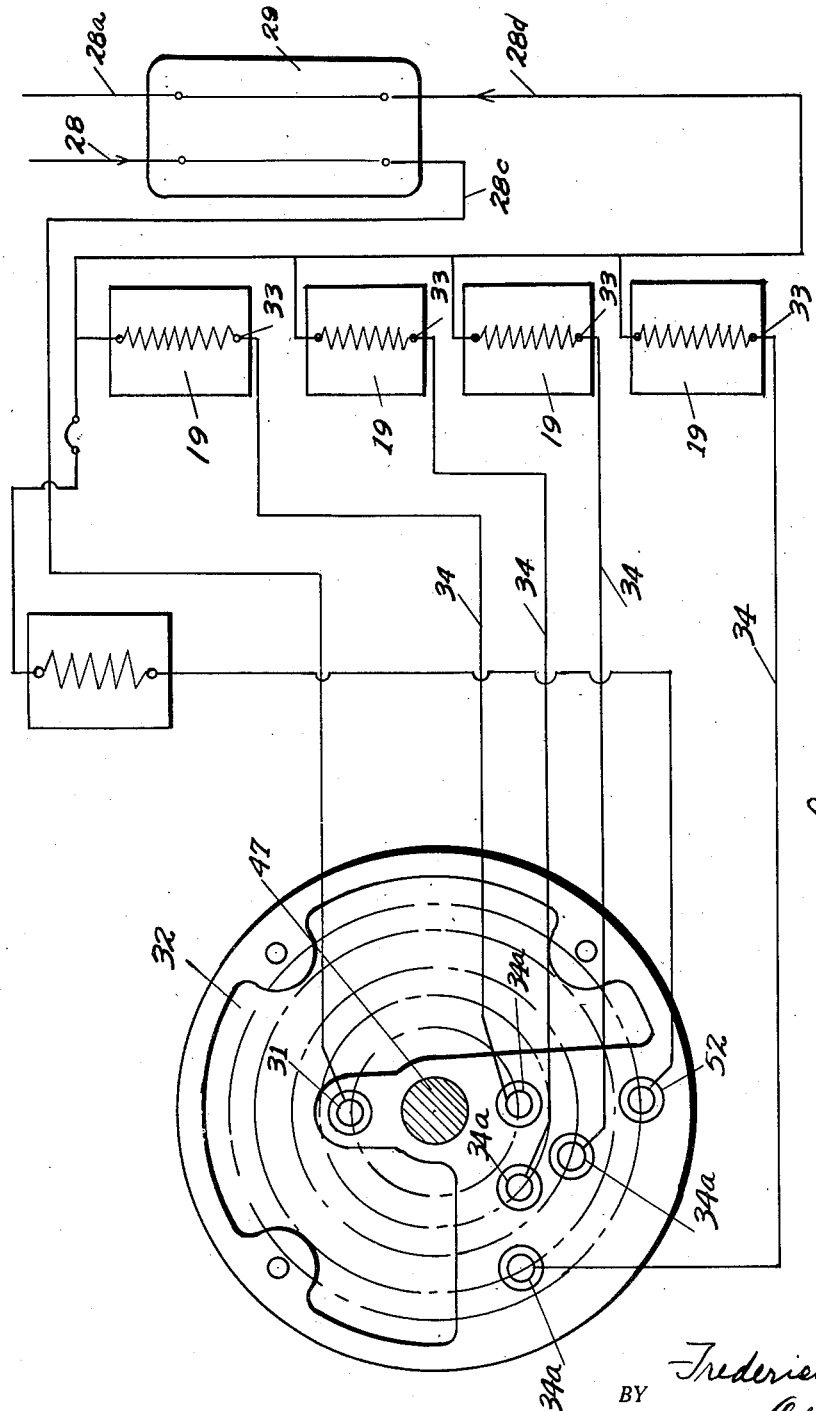

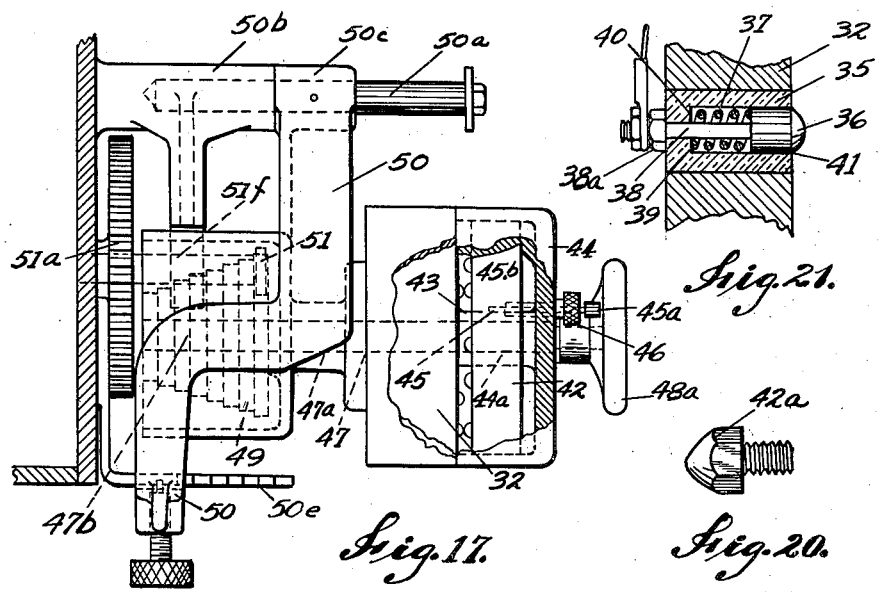
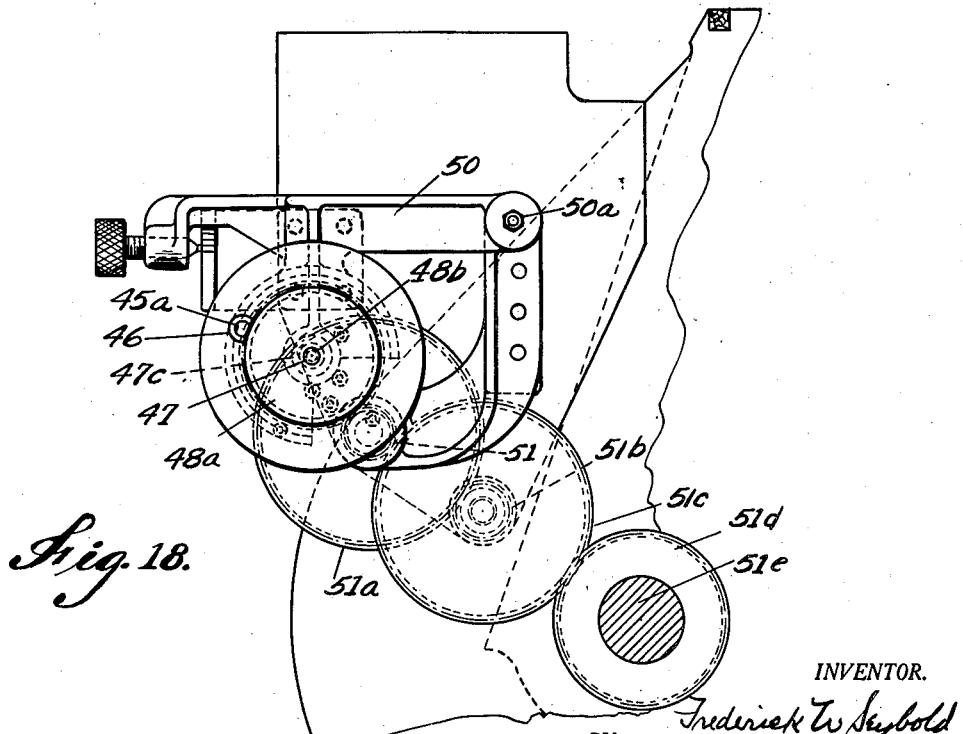

Patented Oct. 4, 1932

1,880,332

UNITED STATES PATENT OFFICE

FREDERICK W. SEYBOLD, OF DAYTON, OHIO, ASSIGNOR TO THE HARRIS-SEYBOLD-POTTER COMPANY, OF DAYTON, OHIO, A CORPORATION OF DELAWARE

PAPER CUTTING MACHINE  REISSUED

Application filed May 20, 1929. Serial No. 364,382.

My invention relates to gauging means used on paper cutting machines similar to the one shown and described in the patent to Charles Seybold, No. 1,541,120, and the like, by which stacks of paper or booklets are subdivided into numerous sections by a series of cuts by the knife of the cutting machine. It also relates to means for disposing of the waste material uniting the sections combined in a particular stack of paper or books to be cut apart.

It is the object of my invention to provide an indexing means or program device operated by an electric or other power control system that will be synchronized with the action of the shear knife.

It is also my object to provide a series of indexing and stop means that can be fixed for any number of cuts in sequence and arranged to function without interference on the part of any previous stop.

Another object is to provide the operator with an indexing and stop means that will automatically determine the proper position of the stack to be cut with relation to the knife of the machine.

Another object is to provide a means for varying the speed of operation of the electric contact device with relation to the number of cuts to be made on any particular stack of paper or books, so as to permit of a cycle of stopping operation largely independent of the number of cuts to be performed.

A further object is to provide a rising and falling table that will permit the handling of subdivisions cut from a stack of paper at a safe distance from the knife of the cutting machine, and also permit the simultaneous disposal of waste materials into a chute at the base of the machine.

These and other objects will be more specifically pointed out in the specification and drawings illustrating in detail a preferred embodiment of my invention.

In the drawings:

Figure 1 is a perspective view of the cutting machine showing the entire stop mechanism.

Figure 2 is a diagrammatic representation of a stack of paper with cutting lines.

Figure 3 is a perspective view of the front left end of the cutting machine showing the front gauge and solenoid operating switch.

Figure 4 is a view of the table operating levers from the front of the machine.

Figure 5 is a perspective view of part of the machine with parts removed.

Figure 6 is a plan view of one of my contact discs.

Figure 7 is a rear end perspective of the machine showing the back table in elevated position.

Figure 8 is a side elevation of the traveling solenoids and part of the stop plate.

Figure 9 is a left side elevation of the table operating mechanism with parts in section.

Figure 10 is a view showing the latch lever and pin only.

Figure 11 is a right side elevation of the back table operating mechanism with the table in elevated position.

Figure 12 is a rear elevation of the table operating mechanism only.

Figure 15 is an enlarged wiring diagram together with the stationary contact disc.

Figure 16 is an enlarged view of the adjusting screw for the stop plate.

Figure 17 is a top plan view of the change gear mechanism.

Figure 18 is a side elevation of the change gear mechanism.

Figure 19 is a perspective of a stop nut and bolt.

Figure 20 is a detail of a moving contactor.

Figure 21 is a section through a stationary contactor.

Figure 13:
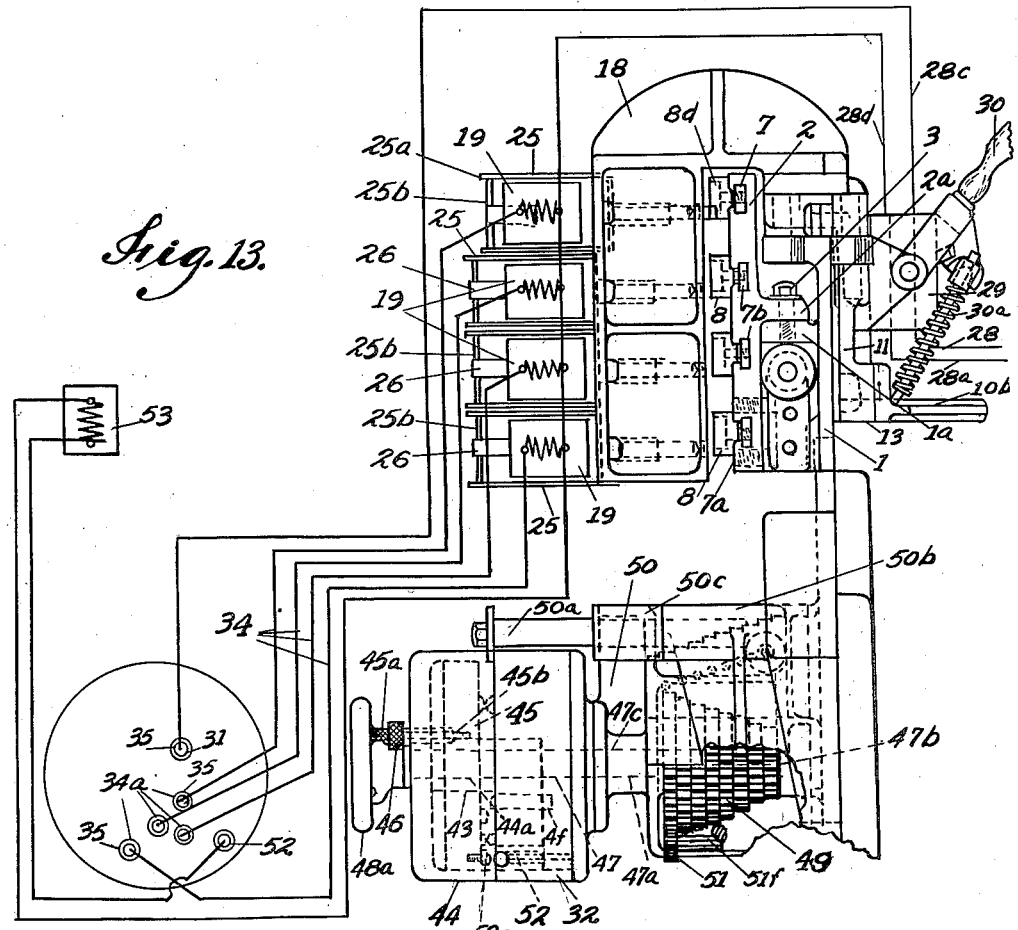
Figure 13 is a front elevation of the stop operating mechanism along with a wiring diagram.

I have, as the preferred embodiment of my invention shown an electric control system for operating members that can engage a series of stops positioned so as to subdivide a stack of books or pamphlets any number of times. I also provide a means for controlling and operating a rising and falling table so that cut books or pamphlets can be conveniently handled at a safe distance from the knife, and at the same time dispose of waste materials that join books or pamphlets in a stack. I am thus enabled to do any type of booking, cutting, or trimming very rapidly in a series of prearranged operations, without relying on the judgment of the operator for their accuracy.

I have shown a cutting machine such as is described in detail in the patent to Charles Seybold No. 1,451,120 and refer to this patent for the clamp, knife, and frame details, but do not wish to limit myself to this machine because my improvement is applicable to all machines of similar nature. On the side gauge 1 of this machine I have slidably mounted a stop plate 2 by means of an extending rib 2a which is part of the stop plate, and another stationary rib 1a on the side gauge which is fixed with relation to the cutting machine. This stop plate can be adjusted with relation to the knife and is held in a set position on the rib of the side gauge by means of the bolts 3, passing through slots 3a in the rib of the stop plate and screwed into the rib of the side gauge.

Figure 14:
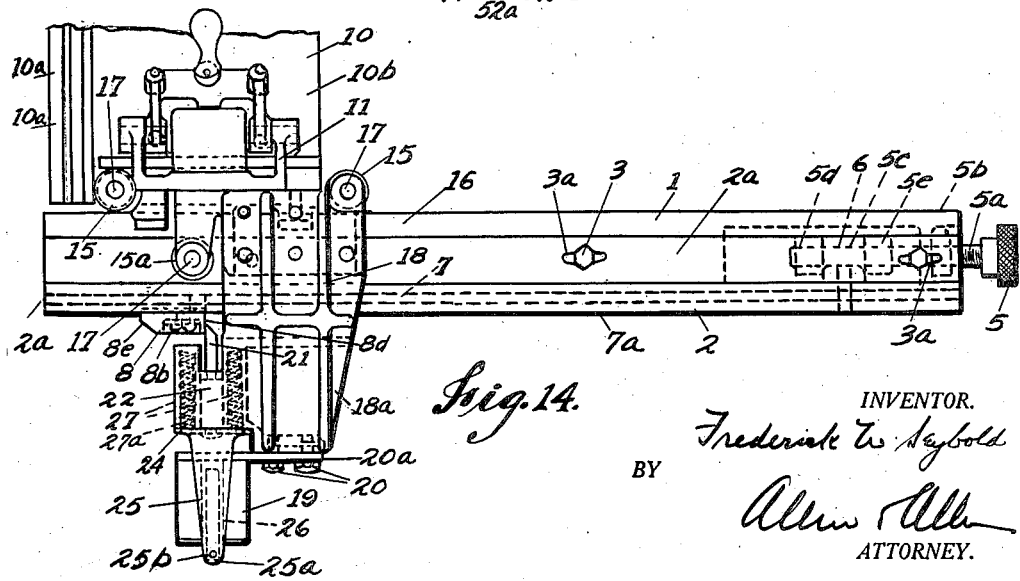
Figure 14 is a plan view of the solenoid carriage and stop plate.

All stops (to be explained) on the plate are set with relation to each other and the cuts to be made to a particular stack of paper or booklets. The positions of the various stops 8a on the stop plate 2, except the stops 77 and 80 for trimming, are determined by the edge 78 (Figure 2) which bears against the posts 10c. A variation in the width of the margin between edges 78 and 81 would disturb all trim and splitting lines with relation to the knife, thereby necessitating a resetting of all stops, except the stops for trimming margins 77 and 80. In order to eliminate this resetting I have provided a knurled handwheel 5 for turning screw 5a in a threaded boss 5b fixed to the side gauge (Figures 14 and 16). An unthreaded end 5c of this screw is free to rotate in a boss 6 cast to the stop plate and confined from lateral movement with relation to the stop plate by means of the thrust collars 5d and 5e on each side of the boss 6. Turning the knurled wheel rotates the screw in the threaded boss, which in turn moves the stop-plate and the stops thereon with relation to the knife, and thereby fixes the position of the second cut and all other cuts which are positively related thereto. The bolts 3 are loosened during this operation and tightened again, as will be apparent.

Stop plate and stops

The stop plate is provided with a series of adjustable fixed stops by the following mechanism (Fig. 19). In its face 7a I have provided T slots 7 to retain in a slidable manner the nuts 7b (Fig. 19). These nuts, together with the screws 7c, clamp and fix the stops 8 on the plate in a position as determined by the length or width of books or pamphlets to be cut. In order to facilitate the accurate setting of the stops, I have provided graduated scales 9 attached adjacent to the edge of the T slots on the surface of the stop plate. The graduations of these scales are fixed with relation to the front edge 2a of the stop plate so that all stops can be set with relation to one another on the stop plate, after which they can be adjusted as a unit with relation to the knife and hence fix all the stops in their proper position for the desired cutting line.

The stops 8 have a counterbored hole 8a to receive the heads of the screws 7c so that they will be below the surface 8b of the stops and not interfere with the pins actuated by the solenoids, (to be explained). A tongue 8c, on the bottom side of the stops, fits into the T slots and keep the stops from turning out of set position. A front end 8d is perpendicular to the plate when the stop is clamped in place. This end is the index point against which pins come in contact and fix the cutting line on a stack of paper or books being subdivided. A back end (see Figure 19) 8e is beveled and allows a pin (to be explained), that may be protruding, to slide over the stop while the solenoid carriage is being returned to starting position. There will be as many stops as there are cuts to be made and all stops can be set before starting to subdivide a particular stack.

Front gauge, solenoids, stop pins and indexing carriage

A front gauge 10, consisting of a plate 10b and a number of posts 10c to form an aligning face 10a perpendicular to the side gauge against which a stack of books or pamphlets abut, is the means for advancing the stack of books or pamphlets towards the knife. It is rigidly supported on a carriage 11 which bears on the table 12 at 13. This front gauge is held in perpendicular relation to the side gauge by means of rollers 15 and 15a, placed on both sides of the top edge 16 of the side gauge. These rollers are rotatably supported on pins 17 fixed in the front gauge carriage and guide the carriage in a straight line parallel to the side gauge by virtue of their position, as can be seen in Figure 14.

Extending from the top and fixed to the front gauge carriage is a bracket 18 for supporting solenoids 19 fastened to box-like members 18a extending down from the arched bracket. The front gauge and carriage with the bracket thereon move as a single unit.

The solenoids are rigidly fastened to the box like member 18a by means of screws 20 through a plate 20a extending from it and fastened to the solenoids. In the present machine there are four solenoids to correspond with the four rows of slots with stops on the plate 2, described. Referring to any one of the solenoids and stop pins it will be seen that the stop pin 21 is slidably mounted in a bearing 22 which is part of the box like member. This bearing provides substantial support for the pin 21 when it comes in contact with a stop 8 (see Figure 14) fixed in place on the plate 2 in the slots 7. Each of the stop pins is attached to a plate 24 which in turn is attached to arms 25 on each side of the solenoids. In the ends 25a of these arms there is a pin 25b which connects to the plungers 26 extending into the solenoids. This pin 25b, together with the stirrup arms 25 and the plate 24, transmits the motion of the solenoid plunger to the stop pins and moves them out so that they can engage the stops 8. Two compression springs 27 for each solenoid confined within the holes 27a in the box like member push on the plate 24 and pull the stop pins out of engagement with the stops 8 just as soon as the solenoids have been de-energized. The position of the stop pin in Figure 14 and that of the top solenoid Figure 13 is the case where the solenoid has been energized. All the pins are normally in a position so as not to interfere with the movement of the front gauge carriage. When the operator moves the carriage so as to advance a book or pile of paper a step, some one of the stop pins 21 will be in position to engage a stop 8 and thereby locate the advanced position of the carriage while the other pins will be out of the way. The electrical system is automatically controlled whereby this movement is accomplished.

*Electrical circuit, contactors and speed control*

All solenoids are connected in parallel or shunt circuit. The main feeder lines 28 and 28a (Figures 13 and 15) pass to terminals on a snap switch 29 located and fixed on the front gauge carriage. This switch is operated by means of a pivoted handle 30 mounted on the front gauge carriage, which is used to manually shift the position of the carriage. The handle is depressed when moving the carriage and a spring 30a pushes the handle up which allows the switch to break circuit just as soon as the handle is released. The continuation 28c of the line 28, on the other side of the switch 29, passes to a common contact point 31 located on a stationary disc 32, which will be further described, and terminates at this point. The continuation 28d of the line 28a is a common feeder to each one of the solenoids 19, (see Figure 15). From the output side of each solenoid connections 34 extend to and are connected to other stationary contact points 34a, also the fixed disc. These contact points are the live points and the solenoids will be energized when other contactors on a rotating disc 42, to be explained, come in contact with the first mentioned points.

Omitting for the present a description of the fixed and rotating discs it will be noted (see Figure 21) that the contact points 31 and 34 are slidably mounted in electrical insulating bushings 35 pressed into the stationary disc 32. The points are insulated from the stationary disc in order to prevent the short circuiting of the solenoids, whose lead wires terminate and connect to the shanks of the contact points 31 and 34a. The top ends 36 of all contact points are rounded to permit the easy passage over one another. A spring 37 surrounds the shank 38 of the pins and bears between the bottom 39 of the counterbored hole 40 in the insulating bushing and the shoulder 41 of the contact point. This spring insures good contact between surfaces, and the end of the shank is threaded to receive an adjusting nut 38a which limits their movement and prevents locking during passage over one another. The contact point 31, as will be noted is in constant electric connection with the rotating disc 42 which serves as an electric connector between the point 31 and a series of contact points 42a (Figure 21) when they make connection with the points 34a, as will be described.

The rotating disc 42 which carries the contact points 42a is slidably mounted on a hub 43 of the hollow case 44, which is made of fiber or other insulating material so as to insulate the rotating disc from the shaft which rotates it and the case. A tapped hole 45 is provided in the disc 42 so that it can always be placed on the hub of the casing in the same position, and insure having the contact points on the disc in proper timing relation with the knife of the cutting machine. Into the tapped hole a stud 45a, with a threaded end 45b is screwed. This stud is rotatively mounted in a sleeve 46, which is fixed in the hollow casing (see Figure 13). When the stud is screwed into the rotating disc it will fix the contact points on the rotating disc with relation to its driving mechanism.

The hub of the hollow casing has a hole 44a for sliding it on shaft 47, where it is held in place by means of a key 48 fixed in the shaft. This shaft rotates the hollow casing and the rotating disc which is fixed within it by means of the stud described. The hollow casing is held from lateral motion on the shaft by means of a handwheel nut 48a screwed onto a threaded portion 48b of the shaft. This handwheel is also used for rotating the casing for a purpose to be noted.

The shaft 47 is rotatively mounted in a bearing 47a, in a casting 47c the face of which forms the stationary disc 32, said casting serving as change gear housing. A cone of gears 49 is fixedly mounted on the end 47b of the shaft. These gears are proportioned so that the speed of the rotating disc can be varied and be in proportion to the number of cuts to be made to a stack of paper.

The casting 47c with the discs and gears thereon is slidably supported and moved by means of a bracket arm 50. This bracket has a bearing 50c slidable along a supporting stud 50a which is fixed in an elongated boss 50b fixed to the main frame of the cutting machine. The pinion 51, which meshes with the cone gears, is driven by means of a large gear 51a fixed to the same shaft 51f on which the pinion 51 is mounted. This shaft is rotatably mounted in bearings provided on the main frame of the cutting machine. The gear 51a is driven by another pinion 51b, also driven by another large gear 51c. This last large gear is driven by another gear 51d which is mounted on and driven by the shaft 51e which actuates the knife of the cutting machine. To vary the speed of the disc, different gears of the cone 9 are brought in contact with a driving pinion 51. To the end of a lever like projection 47d of the casting 47c is mounted a latch pin 50d, for holding the casting in a set position. The pin may be seated in one of a series of holes in an index plate 50e, fixed on the machine frame. By disengaging the latch pin 50d from the holes in the index plate, which holes indicate what particular gear on the cone will be in mesh the gear setting can be changed. The entire bracket may be swung on its supporting stud and slid along the stud to the right or left, after which it is lowered until one of the cone gears meshes with gear 51.

With each stroke of the knife the gears are rotated through a part of a revolution and they in turn rotate the fiber case and its disc 42, thus causing its contact points 42a to advance and come in contact with one of the points 34a, close a circuit and allow a solenoid to be energized and bring out the stop pin so that the front gauge carriage, with a stack of paper or books will hesitate at the proper cutting point when it is moved toward the knife.

The contact points 42a screwed into the disc 42, are disposed radially on concentric circles with the center of the disc so that any set of points on a certain circle will come in contact with a certain contact point 34a, which is on a corresponding concentric circle of the fixed series of points. All concentric circles can be considered as described from the center of the shaft 47.

The machine will be equipped with a set of the rotating discs, which will be interchangeable and each disc will have a number of stops corresponding to the number of cuts desired. When any one of the points on the rotating disc come in contact with the points 34a, the solenoid connected to that particular point will be energized just as soon as the snap switch is operated by the handle 30.

In addition to the contact point 34a there is another similar contact point 52 in the stationary disc. This point is the live point for another solenoid 53 located at the rear of the machine for releasing a latch of a rising table to be explained. In the rotating disc there is a circle of contact points 52a that are spaced to come in contact with the points 52 at certain intervals and energize the table solenoid.

From the description so far it will be evident that the structure as explained acts as a program device for the operation of the cutter, fully elastic to any conceivable demands on such a mechanism.

Back rising and falling table

In order to handle cut materials at a safe and convenient distance from the knife of the cutting machine, and also dispose of the waste materials that occur between subdivisions of a stack of paper or booklets, I have provided a rising and falling table 53a (Figs. 4, 9, 11, and 12). This table is supported on four parallel links 54 pivotally connected to it by means of pins 54a. These links in turn are pivoted on pins 54b which are fixed on the main frame of the cutting machine. In addition to these links a lever 55 is also pivotally connected to the table at 55a by means of a pin 55b fixed in a bracket 56 on the bottom side of the table. This lever is rotatably mounted on a shaft 57 which is rotatably mounted in bearings 57a on each side frame of the cutting machine.

A lower end 55c of the lever 55 is connected to a link 58 by means of a pin 58a, the link being connected to a piston 59 in the cylinder 59a of a dash pot 59d. This dash pot controls the speed with which the table returns to its down position. The cylinder has a bleed hole 59b into which a pet cock 59c is screwed and regulated so that a certain back pressure will be against the piston and cause the table to fall gradually by gravity. The table will fall by gravity against the back pressure in the cylinder because of its weight, and the reason that the table is elevated to such a position so that the center of gravity of its link system is always to the right of any instantaneous center of the parallelogram supporting the table.

The table is raised by means of a forked arm 60, which is fixed on the shaft 57. This arm when the shaft 57 is revolved strikes against the lever 55 and rocks it upwardly so as to elevate the table. On the arm 60 at 60a there is a rubber pad 60b which acts as a bumper for the table when it drops back to down position.

The shaft 57 is rotated by means of a bell crank 61 which is fastened to it. This bell crank 61 has a bifurcated end 61a, in which is pivoted a block 61b slidably mounted on a long rod 62. A compression spring 63, confined on the rod between its supporting member 62a on the main frame and the sliding block is the means for rotating the shaft 57 whenever a latch, to be explained, is released by a solenoid. The spring pushes on the sliding block which in turn rotates the bell crank in a counterclockwise direction and causes the shaft 57 to rotate with the arm 60 and raise the table.

The lower end 62b of the spring rod extends through another dash pot 64, where it is equipped with a piston 64a that retards the action of the spring so that it expands gradually and raises the table without a jar. The dash pot has a bleed valve 64b for adjusting the back pressure on the piston.

A cam 65 fixedly mounted on the shaft 51e which actuates the knife of the cutting machine is the means for compressing the spring so that the table can return to down position. This cam comes in contact with and pushes on a roller 67 rotatably mounted on a pin 67a, which joins two levers 67b and 67c together. The lever 67b is rotatably mounted on a stud 67d fixed in the main frame of the cutting machine, while the link 67c connects to the bell crank lever 61. The cam moves the roller, the link 67c rocks the bell crank, and thus the shaft 57 is rocked and the slide block 61 moved up the rod 62, compressing the spring thereon.

A U shaped member 68 is fastened to the shaft 57 by means of a pin 68a. This arm holds the shaft 57 against movement and the spring 63 in compression while the table is in the down position (see Figure 9). On the end 68b of this arm is rigidly fastened a latch plate 68c under which a latch pin 69 protrudes and holds the member 68 in the position shown in Figures 9 and 10. The latch pin is slidably mounted in a bearing bracket 70 mounted on the main frame of the cutting machine. A compression spring 71 (see Figure 12) surrounds the extension 72 of the latch pin which is connected to the plunger of the solenoid 53 fixed to the main frame of the cutting machine. This spring bears on a shoulder 72a which is part of the extension 72 and a bearing plate 73 which is fixed with relation to the latch pin. The spring pushes the latch pin to the left whenever the solenoid has been deenergized, and puts it in position to catch under the latch plate on arm 68.

Whenever the contact points 52 and 52a come in contact the solenoid 53 will be energized and pull the latch pin 69 to the right and release the latch arm 68 so that the spring 63 can expand and rotate the bell crank, which in turn, rotates the shaft 57 and the arm 60. Rotation of the arm causes the table to rise as has been explained. When the table is in the up position, an opening 74 will be made through which waste materials can fall to a receptacle on the floor and thus prohibit the accumulation of waste materials on the table. When the next operation of the machine takes place the cam 65 will place the spring 63 under compression, which will be held by the latch, and the table returns to downward position by gravity.

Figure 2 is a diagrammatic representation of a stack of booklets combined in a sheet 70 with the cutting line indicated by dots and dashes. This particular case will require 13 stops on the plate 2. The edge 76 is placed against the aligning surface of the front gauge, and the stack is advanced until the line 77 is under the knife where it is cut off. After thus cut, the stack is placed so that the edge 76 is in touch with the side gauge and the edge 78 is against the aligning face of the front gauge. In this position the stack is ready to be subdivided by means of the stops and solenoids.

A set of contact points 52 and 52a will be in contact, and the table will be in up position so that the section 80, which is waste, can fall through the opening 74. The operator presses down the handle 30, which throws on the snap switch 29 and allows one of the solenoids to be energized and push out a stop pin. With the switch handle held down, the operator pushes the front gauge carriage toward the knife, and it will stop in the right place because the stop pin comes in contact with a stop for this cut. The operator then steps on the foot-treadle which causes the knife to make a cut. While the knife is making the cut, the spring operating the rising table will be compressed and allow the table to drop to down position. During this time the disc 42 will be rotated so as to break circuit for the first solenoid, and make contact for the next solenoid in sequence and bring out its stop-pin. The operator again pushes the front gauge carriage forward with the stack which will stop beneath the knife on the line 81. The knife descends, makes the cut and its actuating shaft rotates the disc 42, bringing another set of contact points together, which energize the solenoid 53 which pulls on the latch pin and releases the latch allowing the spring 63 to raise the table. The disc next makes contact between another set of points 34a and 42a which complete another circuit and energize the third solenoid that brings out its stop pin. The operator again pushes the front gauge carriage toward the knife until it is stopped by the stop pin coming in contact with the stop for the cutting line 82. This cut will trim off the waste section 82a which can fall through the opening 74 because the table is up. During the knife stroke, the spring will again be compressed and allow the table to drop and receive the section 83 of booklets on it. The foregoing sequence of operations is continued, each solenoid being energized in succession until the entire stack has been subdivided. All waste materials will be in a receptacle at the base of the machine, while the booklets will be on the table which will be up and away from the knife after the last cut has been made.

Having thus described my invention what I claim as new and novel and desire to secure by Letters Patent, is:—

1. In a paper cutting machine the combination with a cutting mechanism of means for advancing a stack of paper to be cut, stopping means to be applied to the advancing means, at a plurality of stages of its movement and a recurring program device synchronized with the machine for operating said stopping means, said stopping means being electrically operated and said program device comprising an electrical rotary contactor driven continuously in one direction with the cutting mechanism one revolution for each recurrence of the program.

2. In a paper cutting machine, a carriage for moving paper to the knife thereof, a handle for manually advancing said carriage, electrically controlled stopping means for the carriage, and an electrical switch for energizing said stopping means operable with the manipulation of the handle.

3. In a paper cutting machine, a carriage for moving paper to the knife, a member along which the carriage moves, stops arranged in rows along said member, and stops on the carriage one for each row, the stops on the carriage being operable to make or miss contact with the other stops, and a rotary mechanism for operating the carriage stops synchronized with the cutting operations of the machine.

4. In a paper cutting machine, a carriage for moving paper to the knife, a member along which the carriage moves, stops arranged in rows along said member, and stops on the carriage one for each row, the stops on the carriage being operable to make or miss contact, with the other stops, and electrical rotating operating means for the said stops.

5. In a paper cutting machine, a carriage for moving paper to the knife, a member along which the carriage moves, stops arranged in rows along said member, and stops on the carriage one for each row, the stops on the carriage being operable to make or miss contact, with the other stops, and electrical operating means for the said stops, said electrical operating means including a rotating program device.

6. In a paper cutting machine, the combination with the cutting mechanism thereof, of a paper advancing means, a stop plate having adjustable stops thereon, stop means on the advancing means, a program device and actuating means arranged to project the latter stop means into stopping position with relation to the adjustable stops, said program device synchronized with the cutting mechanism, and means for varying the speed of operation of the program device with reference to the cutting mechanism, whereby any given program can be completed in a single cycle of operations largely independent of the number of adjustable stops used.

7. In a paper cutting machine, a carriage for moving paper to the knife, a member along which the carriage moves, stops arranged in rows along said member, and stops on the carriage one for each row, the stops on the carriage being operable to make or miss contact, with the other stops, and electrical operating means for the said stops, a program device for controlling electrical circuits to said carriage stops, the stops on the member being adjustable, and means for driving the program device from the machine including change speed mechanism.

8. In a paper cutting machine a cutting knife and mechanism, a rear table for receiving cut off portions of a stack of paper, means for moving said table away from paper receiving position to permit waste paper to drop, a spring for operating said moving means, means driven by the knife mechanism for placing said spring under tension, and a latch for releasing said moving means for operation.

9. In a paper cutting machine a cutting knife and mechanism, a rear table for receiving cut off portions of a stack of paper, means for moving said table away from paper receiving position to permit waste paper to drop, a spring for operating said moving means, means driven by the knife mechanism for placing said spring under tension, and a latch for releasing said moving means for operation, power means to operate the said latch, and a program device for operating said power means, in a pre-arranged cycle.

10. In a paper cutting machine a cutting knife and mechanism, a rear table for receiving cut off portions of a stack of paper, means for moving said table away from paper receiving position to permit waste paper to drop, a spring for operating said moving means, means driven by the knife mechanism for placing said spring under tension, and a latch for releasing said moving means for operation, a solenoid to operate the said latch and a program device arranged to close a circuit to energize said solenoid in a pre-arranged cycle.

11. In a paper cutting machine a cutting knife and mechanism, a rear table for receiving cut off portions of a stack of paper, means for moving said table away from paper receiving position to permit waste paper to drop, a spring for operating said moving means, means driven by the knife mechanism for placing said spring under tension, and a latch for releasing said moving means for operation, a solenoid to operate the said latch and a program device arranged to close a circuit to energize said solenoid in a pre-arranged cycle, said program device driven in synchronism with the knife mechanism.

12. In a paper cutting machine the combination with a cutting mechanism of means for advancing a stack of paper to be cut, stopping means to be applied to the advancing means, at a plurality of stages of its movement and an electrically controlled program device synchronized with the machine for operating said stopping means, a back table to receive material cut by the cutting mechanism, and an electrically controlled program device means for operating said back table up and down in synchronized relation to selected operations of the cutting mechanism.

13. In a paper cutting machine the combination of a series of fixed stops to fix the cutting line on a stack of paper, a carriage to advance a stack of paper to the cutting line, stop means on the carriage, and power operated means for bringing the carriage stop means and fixed stops into position for interengagement, and an electrically controlled program device controlling the power operated means, a back table movable upward for escape of scrap and movable downward to receive material cut by the machine, and an electrically controlled program device means for controlling the up and down motion of said back table operation in synchronized relation to the operation of selected ones of the stops.

14. In a paper cutting machine the combination of a series of fixed stops to fix the cutting line on a stack of paper, a carriage to advance a stack of paper to the cutting line, stop means on the carriage, and power operated means for bringing the carriage stop means and fixed stops into position for interengagement, and a program device controlling the power operated means, a back table to receive material cut by the machine, and program device means for controlling said back table operation in synchronized relation to the operation of selected ones of the stops, said fixed stops being adjustable with relation to the machine as a whole without change of relation to each other and without change of the program device.

15. In a paper cutting machine, a carriage for moving paper to the knife, a member along which the carriage moves, stops arranged in rows along said member, and stops on the carriage one for each row, the stops on the carriage being operable to make or miss contact, with the other stops, and electrical operating means for the said stops, said electrical operating means including a program device, and means for adjusting the said member in position with relation to the machine.

16. A back table for paper cutting machines comprising in combination with the machine frame and the table a parallel link support for the table, whereby it may move while remaining parallel to a single plane, a spring so connected with the table as to move it away from normal position, a latch to hold the table in normal position, and a machine operated member for tensioning the said spring.

17. A back table for paper cutting machines comprising in combination with the machine frame and the table a parallel link support for the table, whereby it may move while remaining parallel to a single plane, a spring so connected with the table as to move it away from normal position, a latch to hold the table in normal position, and a machine operated member for tensioning the said spring, said spring connection with the table including a member which abuts against a part connected thereto without being secured to the same, said machine operated member also connected so as to return the last noted member to position of noninterference with return of the table to normal position.

18. In a paper cutting machine, a carriage for moving paper to the knife, a member along which the carriage moves, stops arranged in rows along said member, and stops on the carriage one for each row, the stops on the carriage being operable to make or miss contact with the other stops, and electrical operating means for the said stops, said electrical operating means including a program device, and a switch common to all stop circuits for the carriage stops and located on the carriage.

19. In a paper cutting machine the combination of a series of fixed stops to fix the cutting line on a stack of paper, a carriage to advance a stack of paper to the cutting line, stop means on the carriage, and power operated means for bringing the carriage stop means and fixed stops into position for interengagement, and a control member on the carriage for setting the power operated means into operation.

20. In combination with a stop program device for controlling the position of a carriage in paper cutting machines, a moving table electrically controlled by said program device, mechanical means operated by moving elements of said cutting machine, comprising a compression spring, levers operable by said compression spring, a shaft operable by said levers, a latch to hold the said table in a desired position and means in conjunction with said program device for releasing said latch.

21. In combination with a stop program device for controlling the position of a carriage in paper cutting machines, a moving table electrically controlled by said program device, mechanical means operated by moving elements of said cutting machine, comprising a compression spring, levers operable by said compression spring, a shaft operable by said levers, a latch to hold the said table in a desired position and means in conjunction with said program device for releasing said latch, and a cam element driven by driving elements of said cutting machine to operate said levers and compress said spring for the next operation of said moving table.

22. In a spacing device for a cutting machine having a succession of stops, electrically operated stop fingers to coact with the stops, a rotating contact disc with spaced contact points for closing circuits through the stop finger operating means, a housing for rotating said disc, a stationary disc with contact points spaced thereon to be engaged by the contact points of the rotating disc, a member rotatively mounted in said stationary disc for mounting said rotating disc in said housing, and means for driving said rotary disc.

23. In a spacing device for a cutting machine having a succession of stops, electrically operated contact fingers to coact with the stops, a rotating contact disc with spaced contact elements, a housing in which said disc is removably mounted and interchangeable with another disc with differently spaced contact elements, a stationary disc with contact elements spaced thereon to be contacted by the contact points of the rotating disc, and means for operatively connecting said rotary disc and housing to the cutting machine.

24. In a spacing device for a cutting machine having a succession of stops, electrically operated contact fingers to coact with the stops, a rotating disc with spaced contact elements, a stationary disc with contact elements spaced thereon to be contacted by the contact points of the rotating disc, contact points of discs being connected with the electrical operating means of respective contact fingers, and a change-speed operative connection for operatively connecting said rotary disc to the cutting machine.

25. In a spacing device for a cutting machine having a succession of stops, electrically operated contact fingers to coact with said stops, a bracket, a stationary disc rigid with said bracket, a shaft journaled in said bracket and stationary disc and extending beyond said stationary disc, a housing having a hub portion, said housing and hub portion mounted on the extended portion of the shaft and rotating therewith, spaced contact elements for an electric circuit carried by the stationary disc and the rotative disc, for closing circuits through the operating means of the respective contact fingers, means on the housing for positioning the rotative disc in the housing, and means for driving the housing and rotative disc at varying speeds.

26. In a paper cutting machine, in combination with the cutting mechanism thereof and the member for advancing stock to the mechanism, a stop device comprising stops in succession along the direction of advance, a stop device comprising a stop to coact successively with the succession of stops, one of two coacting stops in each coaction being movable into and out of position for engagement with the other coacting stop, and both stop devices being fixed against displacement laterally of the path of advance, program mechanism controlling the movement of the movable stop for each coaction, and a change-speed operative connection between said cutting mechanism and said program mechanism, operating said program mechanism in synchronism with said cutting mechanism continuously in one direction.

27. In a paper cutting machine, in combination with the cutting mechanism thereof and the member for advancing stock to the cutting mechanism, a stop device comprising stops in succession along the direction of advance, a stop device comprising a stop to coact successively with the succession of stops, one of two coacting stops in each coaction being movable into and out of position for engagement with the other coacting stop, program mechanism controlling the movement of the movable stop for each coaction, and a change-speed operative connection between said cutting mechanism and said program mechanism, operating said program mechanism in synchronism with said cutting mechanism continuously in one direction.

28. In a paper cutting mechanism, in combination with the cutting mechanism thereof and the member for advancing stock to the cutting mechanism, a stop device comprising stops in succession along the direction of advance, a stop device comprising a stop to coact successively with the succession of stops, one of two coacting stops in each coaction being movable into and out of position for engagement with the other coacting stop, program mechanism controlling the movement of the movable stop for each coaction, and an operative connection between said cutting mechanism and said program mechanism, operating said program mechanism in synchronism with said cutting mechanism continuously in one direction, both of said stop devices being fixed against displacement laterally of the path of advance.

29. In a paper cutting machine, in combination with the cutting mechanism thereof and the member for advancing stock to the cutting mechanism, a stop device comprising stops in succession along the direction of advance, a stop device comprising a stop to coact successively with the succession of stops, one of two coacting stops in each coaction being movable into and out of position for engagement with the other coacting stop and both stop devices being fixed against displacement laterally of the path of advance, program mechanism controlling the movement of the movable stop for each co-action, and a change-speed operative connection between said cutting mechanism and said program mechanism, operating said program mechanism in synchronism with said cutting mechanism.

FREDERICK W. SEYBOLD.